US012157206B2

(12) United States Patent
Eggert et al.

(10) Patent No.: US 12,157,206 B2
(45) Date of Patent: Dec. 3, 2024

(54) SOCKET DRIVE IMPROVEMENT

(71) Applicant: Snap-on Incorporated, Kenosha, WI (US)

(72) Inventors: Daniel M. Eggert, Kenosha, WI (US); Christopher D. Thompson, Franklin, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/463,042

(22) Filed: Aug. 31, 2021

(65) Prior Publication Data

US 2021/0394341 A1 Dec. 23, 2021

Related U.S. Application Data

(63) Continuation of application No. 16/504,718, filed on Jul. 8, 2019, now Pat. No. 11,173,580, which is a continuation of application No. 15/634,697, filed on Jun. 27, 2017, now Pat. No. 10,442,060, which is a continuation of application No. 14/309,954, filed on Jun. 20, 2014, now Pat. No. 9,718,170.

(60) Provisional application No. 61/904,754, filed on Nov. 15, 2013.

(51) Int. Cl.
*B25B 13/06* (2006.01)

(52) U.S. Cl.
CPC .................................. *B25B 13/065* (2013.01)

(58) Field of Classification Search
CPC ........ B25B 13/06; B25B 13/065; B25B 13/08
See application file for complete search history.

(56) References Cited

U.S. PATENT DOCUMENTS

| | | | |
|---|---|---|---|
| 2,685,219 | A | 8/1954 | Diebold |
| 2,969,250 | A | 1/1961 | Kull |
| 3,125,910 | A | 3/1964 | Kavalar |
| 3,242,775 | A | 3/1966 | Hinkle |
| 3,273,430 | A | 9/1966 | Knudsen et al. |
| 3,675,516 | A | 7/1972 | Knudsen |

(Continued)

FOREIGN PATENT DOCUMENTS

| | | | |
|---|---|---|---|
| CN | 2178160 | Y | 9/1994 |
| CN | 2276859 | Y | 3/1998 |

(Continued)

OTHER PUBLICATIONS

JK Office Action for Application No. GB1420305.3, dated Dec. 1, 2017, 5 pages.

(Continued)

*Primary Examiner* — David B. Thomas
(74) *Attorney, Agent, or Firm* — Taft Stettinius & Hollister LLP

(57) ABSTRACT

Sockets, for example, hexagon sockets, dodecagonal sockets, and splined sockets, that have inner surface geometries adapted to engage a flank of a fastener at a point away from a corner of the fastener. In general, the sockets engage the flank of the fastener at a distance of about 30 to 60 percent of half a length of the flank away from the corner of the fastener. This increases the strength and life of the socket, reduces a risk of the fastener becoming locked or stuck in the socket, and reduces the risk of the fastener being stripped or the socket slipping on the fastener.

20 Claims, 13 Drawing Sheets

(56) References Cited

U.S. PATENT DOCUMENTS

| | | | |
|---|---|---|---|
| 3,908,488 | A | 9/1975 | Andersen |
| 4,512,220 | A | 4/1985 | Barnhill |
| 4,581,957 | A | 4/1986 | Dossier |
| 4,646,594 | A | 3/1987 | Tien |
| 4,765,211 | A | 8/1988 | Colvin |
| 4,882,957 | A | 11/1989 | Wright et al. |
| 4,930,378 | A | 6/1990 | Colvin |
| 5,012,706 | A | 5/1991 | Wright |
| 5,092,203 | A | 3/1992 | Mader |
| 5,219,392 | A | 6/1993 | Ruzicka et al. |
| 5,284,073 | A | 2/1994 | Wright et al. |
| 5,388,486 | A | 2/1995 | Ruzicka |
| 5,406,868 | A * | 4/1995 | Foster .................... B25B 13/08 81/186 |
| 5,476,024 | A | 12/1995 | Hsieh |
| 5,481,948 | A | 1/1996 | Zerkovitz |
| 5,832,792 | A | 11/1998 | Hsieh |
| 5,878,636 | A | 3/1999 | Baker |
| 6,079,299 | A | 6/2000 | Sundstrom |
| 6,082,228 | A | 7/2000 | Macor |
| 6,098,501 | A | 8/2000 | Sundstrom |
| 6,263,769 | B1 | 7/2001 | Macor |
| 6,354,175 | B1 | 3/2002 | Dobson et al. |
| 6,655,888 | B2 | 12/2003 | Schultz |
| 6,668,686 | B1 | 12/2003 | Hsien |
| 6,745,649 | B1 | 6/2004 | Liao |
| 6,820,521 | B2 | 11/2004 | Dobson |
| 6,938,524 | B2 | 9/2005 | Hsien |
| 6,962,100 | B2 | 11/2005 | Hsien |
| 7,000,505 | B2 | 2/2006 | Hsien |
| 7,168,347 | B2 | 1/2007 | Hsieh |
| 7,226,262 | B2 | 6/2007 | Schultz |
| 7,228,764 | B1 | 6/2007 | Macor |
| 7,261,020 | B2 | 8/2007 | Hsieh |
| 7,270,032 | B1 | 9/2007 | Hsieh |
| 7,311,021 | B2 | 12/2007 | Macor |
| 7,331,260 | B2 | 2/2008 | Chen |
| 7,331,744 | B2 | 2/2008 | Schultz |
| 7,340,982 | B2 | 3/2008 | Wright |
| 7,437,975 | B1 | 10/2008 | De Anfrasio |
| 7,437,977 | B2 | 10/2008 | Hsieh |
| 7,661,339 | B2 | 2/2010 | Wu |
| 8,056,448 | B2 | 11/2011 | Chen |
| 8,667,873 | B2 | 3/2014 | Hsieh |
| 8,973,471 | B2 | 3/2015 | Hsieh |
| 9,718,170 | B2 | 8/2017 | Eggert |
| 10,442,060 | B2 | 10/2019 | Eggert |
| 2002/0039523 | A1 | 4/2002 | Hartman |
| 2002/0104409 | A1 | 8/2002 | Hu |
| 2003/0126960 | A1 | 7/2003 | Chen |
| 2004/0020332 | A1 | 2/2004 | Hsieh |
| 2004/0093996 | A1 | 5/2004 | Fu |
| 2004/0121845 | A1 | 6/2004 | Delaney et al. |
| 2004/0163504 | A1 | 8/2004 | Chen |
| 2006/0090610 | A1 | 5/2006 | Liao |
| 2006/0130618 | A1 | 7/2006 | Hsieh |
| 2006/0150782 | A1 | 7/2006 | Hsieh |
| 2006/0156869 | A1 | 7/2006 | Hsieh |
| 2006/0272457 | A1 | 12/2006 | Macor |
| 2007/0044595 | A1 | 3/2007 | Macor |
| 2007/0084314 | A1 | 4/2007 | Harker |
| 2007/0137441 | A1 | 6/2007 | Wright |
| 2008/0006126 | A1 | 1/2008 | Hsieh |
| 2008/0060483 | A1 | 3/2008 | Macor |
| 2008/0148906 | A1 | 6/2008 | Wu |
| 2009/0133539 | A1 | 5/2009 | Cheng |
| 2009/0235788 | A1 | 9/2009 | Hsieh |
| 2009/0285653 | A1 | 11/2009 | Schultz |
| 2010/0224035 | A1 | 9/2010 | Hu |
| 2011/0197718 | A1 | 8/2011 | Meholovitch |
| 2011/0290086 | A1 | 12/2011 | Chiu |
| 2012/0189980 | A1 * | 7/2012 | Kuehne ............... A61C 8/0018 433/141 |
| 2015/0135910 | A1 | 5/2015 | Eggert et al. |
| 2017/0363129 | A1 | 12/2017 | Bada |
| 2019/0275646 | A1 | 9/2019 | Liu |
| 2020/0070321 | A1 | 3/2020 | Schulz |

FOREIGN PATENT DOCUMENTS

| | | | |
|---|---|---|---|
| CN | 2291994 | Y | 9/1998 |
| CN | 101066587 | A | 11/2007 |
| CN | 101168246 | A | 4/2008 |
| CN | 102765068 | A | 11/2012 |
| CN | 104889915 | A | 9/2015 |
| CN | 107756300 | A | 3/2018 |
| CN | 111230779 | A | 6/2020 |
| DE | 1603963 | | 9/1970 |
| EP | 2478864 | A2 | 7/2012 |
| GB | 2501181 | A | 10/2013 |
| GB | 2520435 | | 5/2015 |
| JP | S5046851 | U | 5/1975 |
| TW | 249372 | | 6/1995 |
| TW | 54206 | | 7/2003 |
| TW | M254303 | | 1/2005 |
| TW | M255768 | | 1/2005 |
| TW | 20062143 | A | 7/2006 |
| TW | M294999 | | 8/2006 |
| TW | M298496 | | 10/2006 |
| TW | M399777 | | 3/2011 |
| TW | M409138 | | 8/2011 |
| TW | 201223709 | A | 6/2012 |
| TW | M430342 | | 6/2012 |
| TW | I562863 | B | 12/2016 |
| WO | 2001032365 | | 5/2001 |
| WO | 03106849 | A1 | 12/2003 |
| WO | 2013145697 | | 10/2013 |
| WO | 2020225800 | A1 | 11/2020 |

OTHER PUBLICATIONS

Chinese Office Action for Application No. 201410650734.4, dated Mar. 23, 2016, 10 pages.

Taiwan Search Report for Application No. 103132135, dated Feb. 21, 2016, 2 pages.

Canadian Office Action for Application No. 2,864,338, dated Feb. 26, 2016, 3 pages.

Australian Examination Report for Application No. 2014224130, dated Jul. 29, 2015, 4 pages.

Great Britain Search Report and Examination Report for Application No. 1420305.3, dated Feb. 27, 2015, 10 pages.

Wurth USA, Automotice Catalog, Section 8 Tools and Shop Supplies, p. 08.0005, Wurth Combination Wrenches With Powerdrive®, Revision Mar. 2011, 3 pages.

Wurth, USA, Automotive Catalog, Section 8 Tools and Shop Supplies, p. 08.0025, ¼" Multi-Use-Socket Set, Revision Mar. 2011, 3 pages.

Chinese Office Action for Application No. 202010086816.6 dated Jan. 26, 2021, 13 pages.

Chinese Office Action for Application No. 201710876823.4 dated Apr. 22, 2020, 7 pages.

Examination Report No. 1 Application No. 2019240548 dated Apr. 24, 2020, 4 pages.

United Kingdom Office Action for Application No. GB1713529.4 dated Mar. 13, 2019, 3 pages.

Chinese Office Action for Application No. 2014106507344 dated Feb. 3, 2019, 9 pages.

Chinese First Office Action for Application No. 201710876823.4 dated Oct. 29, 2018, 10 pages.

UK Combined Search and Examination Report for Application No. GB1713529.4 dated Dec. 7, 2018, 6 pages.

Examination Report for United Kingdom Application No. GB1713526.0 dated Sep. 20, 2018, 3 pages.

Taiwan Office Action for Application No. 107107300 dated Jul. 18, 2018, 10 pages.

Australian Office Action for Application No. 2017245464 dated Jun. 19, 2018, 3 pages.

Australian Office Action for Application No. 2017245465 dated Jun. 19, 2018, 4 pages.

(56) References Cited

OTHER PUBLICATIONS

UK Office Action for Application No. GB1713526.0 dated May 9, 2018, 5 pages.
UK Office Action for Application No. GB1420305.3 dated Apr. 10, 2018, 3 pages.
Chinese Office Action for Application No. 201410650734.4 dated Jan. 11, 2018, 8 pages.
Canadian Office Action for Application No. 3975449 dated Nov. 30, 2017, 3 pages.
Taiwan Office Action for Application No. 105129382 dated Jul. 20, 2017, 4 pages.
Chinese Office Action for Application No. 201410650734.4 dated Jun. 16, 2017, 8 pages.
Examiner's Report dated Jun. 16, 2017, 3 pages.
Chinese Re-exam Notification for Application No. 201410650734.4 dated Jul. 9, 2019, 9 pages.
Chinese Office Action for Application No. 201710876823.4 dated Jul. 4, 2019, 7 pages.
Chinese Office Action for Application No. 201710876823.4 dated Dec. 9, 2019, 8 pages.
Chinese Office Action for corresponding Application No. 202010086816.6 dated Feb. 7, 2022, 7 pages.
Chinese Office Action for corresponding Application No. 202010086816.6 dated Aug. 13, 2021, 3 pages.
Chinese Office Action for corresponding Application No. 2021107385128 dated Oct. 19, 2022, 12 pages.
Australian Examination Report No. 2 for corresponding AU Application No. 2021202775, dated Nov. 2, 2022, 3 pages.
Canadian Office Action for corresponding CA Application No. 3,124,034, dated Nov. 9, 2022, 5 pages.
United Kingdom Examination Report for corresponding UK Application No. GB2108959.4, dated Nov. 10, 2022, 6 pages.
Taiwan Office Action for corresponding TW Application No. 110124203, dated Dec. 20, 2022, 15 pages.
Examination Report No. 3 for corresponding Application No. 2021202775 dated Mar. 29, 2023, 3 pages.
Fourth Office Action for corresponding Chinese Application No. 2017108768234 dated Feb. 28, 2023, 11 pages.
Examination Report for corresponding Application No. GB2108959.4 dated Feb. 16, 2023, 6 pages.
Examination Report No. 1 for corresponding Application No. 2021202775 dated Apr. 4, 2022, 4 pages.
Examination Report No. 1 for corresponding Application No. 2021204591 dated Jun. 6, 2022, 2 pages.
Combined Search and Examination Report for corresponding Application No. GB2108959.4 dated Apr. 25, 2022, 8 pages.
Examination Report for corresponding United Kingdom Application No. GB2108959.4 dated May 30, 2023, 6 pages.
Examination Report No. 3 for corresponding Application No. 2021204591 dated Jun. 5, 2023, 3 pages.
Fifth Office Action for corresponding Application No. 2017108768234 dated Jun. 5, 2023, 11 pages.
Chinese Office Action for corresponding Application No. 2017108768234 dated Oct. 9, 2023, 11 pages.
United Kingdom Combined Search and Examination Report for corresponding UK Application No. GB2315102.0, dated Jan. 26, 2024, 7 pages.

* cited by examiner

SOCKET DRIVE IMPROVEMENT

CROSS REFERENCES TO RELATED APPLICATIONS

This application is a continuation of and claims the benefit of U.S. patent application Ser. No. 16/504,718, Socket Drive Improvement, filed Jul. 8, 2019, which is a continuation of U.S. patent application Ser. No. 15/634,697 (now U.S. Pat. No. 10,442,060), Socket Drive Improvement, filed Jun. 27, 2017, which is a continuation of U.S. patent application Ser. No. 14/309,954 (now U.S. Pat. No. 9,718,170), Socket Drive Improvement, filed Jun. 20, 2014, which claims the benefit of U.S. Provisional Patent Application Ser. No. 61/904,754, Socket Drive Improvement, filed Nov. 15, 2013, the contents of which are incorporated herein by reference in their entirety.

TECHNICAL FIELD

The present application relates generally to tools for driving fasteners, and in particular to sockets and drives for tools.

BACKGROUND

A variety of wrenches and tools are commonly used to apply torque to a workpiece, such as a threaded fastener. The workpiece may be any number of different sizes and shapes and fitments. Accordingly, many tools include a driver adapted to mate with one or more different adapters, such as sockets, to engage and rotate the different workpieces. For example, for a typical bolt having a hex head, inner walls of a hexagonally shaped socket engage the fastener at or very near the corners of the fastener head, thereby allowing the tool to impart torque to the workpiece. However, due to this engagement, the socket may become pre-maturely fatigued and fail due to repeated stress being placed on the socket walls from the corners of the fastener. In addition, upon application of torque to the fastener, the fastener can become frictionally locked in the socket due to minor amounts of rotation of the fastener within the socket or easily stripped due to inadequate head to socket interaction.

SUMMARY

The present application relates to sockets, for example, hexagon sockets, double hexagon sockets, and spline sockets, adapted to engage fasteners at a location further from a corner of the fasteners, relative to conventional sockets. By shifting the point of contact or engagement of the socket and fastener head away from the corners of the fastener head, the strength and life of the socket is increased, and the risk of the fastener becoming frictionally locked in the socket or stripped by the socket is decreased.

In an embodiment, a hexagonal socket includes an axial bore having a generally hexagonal cross section with six longitudinal sidewalls that extend between six corresponding recesses. Each of the sidewalls includes a first straight portion disposed between two second straight portions that are angularly displaced by about 5-7 degrees with respect to the first portion. The second portions also have a length equal to about 20-30 percent of a length of the first portion. It has been shown that this geometry of the socket provides for a contact point between the sidewalls, substantially at an intersection of a second portion with the first portion, and a flank of a head of a fastener that is a distance of about 30 to 60 percent of half a length of the flank away from a corner of the head of the fastener, thus increasing the surface area of contact and life expectancy of the socket and fastener head.

In another embodiment, a dodecagonal type socket includes an axial bore having a generally dodecagonal cross-section with twelve longitudinal sidewalls extending between twelve corresponding recesses. Each of the sidewalls includes a first portion and a second portion that are angularly displaced by about 40-45 degrees relative to each other. This geometry of the socket provides for a contact point between the socket, substantially at an intersection of the first and second portions, and a flank of a head of a fastener that is a distance of about 30 to 60 percent of half a length of the flank away from a corner of the head of the fastener, thus increasing the surface area of contact and life expectancy of the socket.

In another embodiment, a splined socket includes an axial bore having twelve longitudinal sidewalls between twelve corresponding recesses. Each of the sidewalls includes a first portion and a second portion that are angularly displaced by about 40-45 degrees. This geometry of the bore provides for a contact point between the socket, proximal to an intersection of the first and second portions, and a flank of a head of a fastener that is a distance of about 30 to 60 percent of half a length of the flank away from a corner of the head of the fastener, thus increasing the surface area of contact and life expectancy of the socket.

BRIEF DESCRIPTION OF THE DRAWINGS

Embodiments of devices and methods are illustrated in the figures of the accompanying drawings which are meant to be exemplary and not limiting, in which like references are intended to refer to like or corresponding parts, and in which.

DETAILED DESCRIPTION

Figure 1:
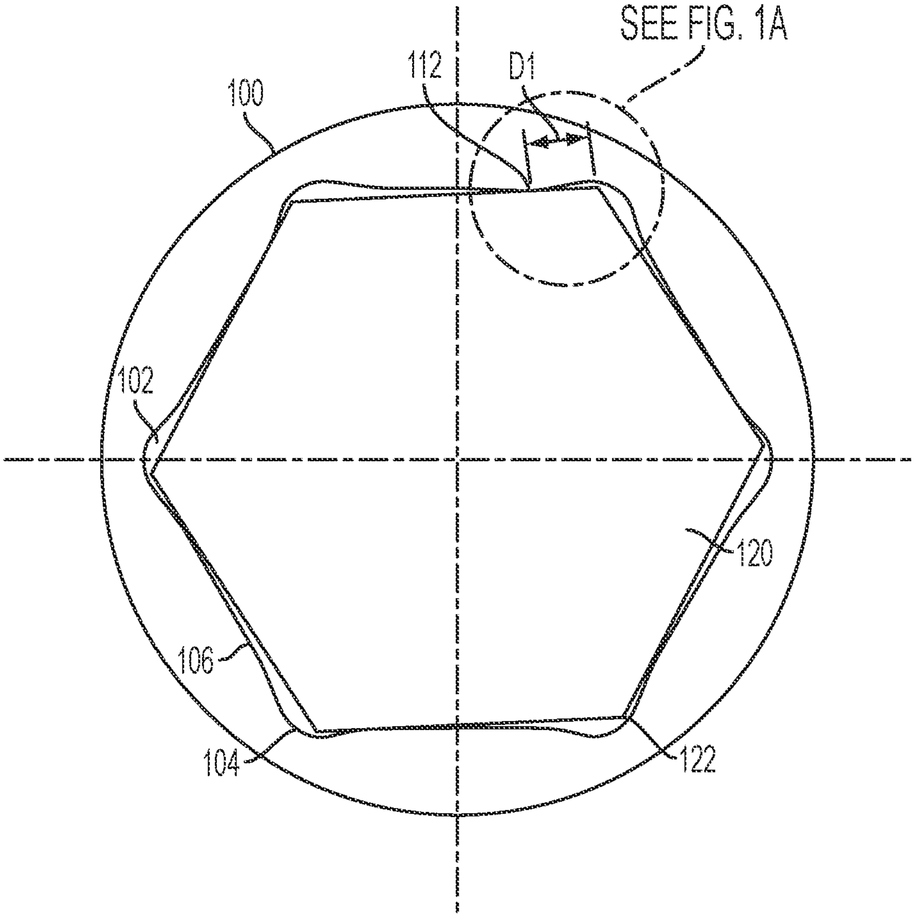
FIG. 1 is a top plan view of a hexagonal socket in accordance with an embodiment of the present application in engagement with a typical hexagonal bolt head or nut.

Detailed embodiments of devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims and as a representative example for teaching one skilled in the art to variously employ the present disclosure.

The present application relates to tools adapted to engage a head of a fastener, such as a hexagonal nut or bolt (also referred to herein as a fastener head). The tools are adapted to engage fasteners at a point away from a corner of the fasteners, which increases strength and life of the tool, reduces a risk of the fastener becoming frictionally locked or stuck in the tool, and reduces the risk of the fastener being stripped or the tool slipping on the fastener.

In an embodiment, the tools are sockets adapted to mate with lugged wrenches, such as ratchets. In general, the sockets include a body having first and second ends. A first axial bore in the first end is adapted to receive a fastener head, such as a bolt head or nut, and a second axial bore in the second end adapted to matingly engage with a lugged wrench in a well-known manner. The first axial bore may have a polygonal cross-sectional shape axially extending at least partially through the body from the first end toward the second end. In an embodiment, the polygonal cross-sectional shape is a generally hexagonal shape adapted to engage the fastener head, such as a hexagonal bolt head or nut. The hexagonal cross sectional shape may be, for example, about a ½ inch cross sectional shape. In other embodiments, the hexagonal cross sectional shape may be larger or smaller, for example, the cross section shape may be SAE ¼ inch, a ⅜ inch, a ¾ inch, a 1 inch, a 1 and ½ inch, etc. or metric sizes, inclusive of all ranges and sub-ranges there between. In yet other embodiments, the first axial bore may be formed to have different cross-sectional shapes adapted to mate with different shaped fastener heads, for example, triangular, rectangular, pentagonal, heptagonal, octagonal, hex shaped, double hexagonal, spline or other shapes of the type.

The second axial bore may have a substantially square cross-sectional shape extending at least partially through the body from the second end to the first end. The second axial bore may be adapted to matingly engage a drive shaft or drive lug of a tool, for example, a hand tool, a socket wrench, a torque wrench, an impact driver, an impact wrench, and other tools, in a well-known manner. The squared cross-sectional shape may be, for example, about a ½ inch square or other SAE or metric sizes. In yet other embodiments, the second axial bore may be formed to have different cross-sectional shapes adapted to mate with different shaped receptacles of different tools, for example, the cross-sectional shape of the second axial bore may be triangular, rectangular, pentagonal, hexagonal, heptagonal, octagonal, hex shaped or other shapes of the type.

Figure 1A:
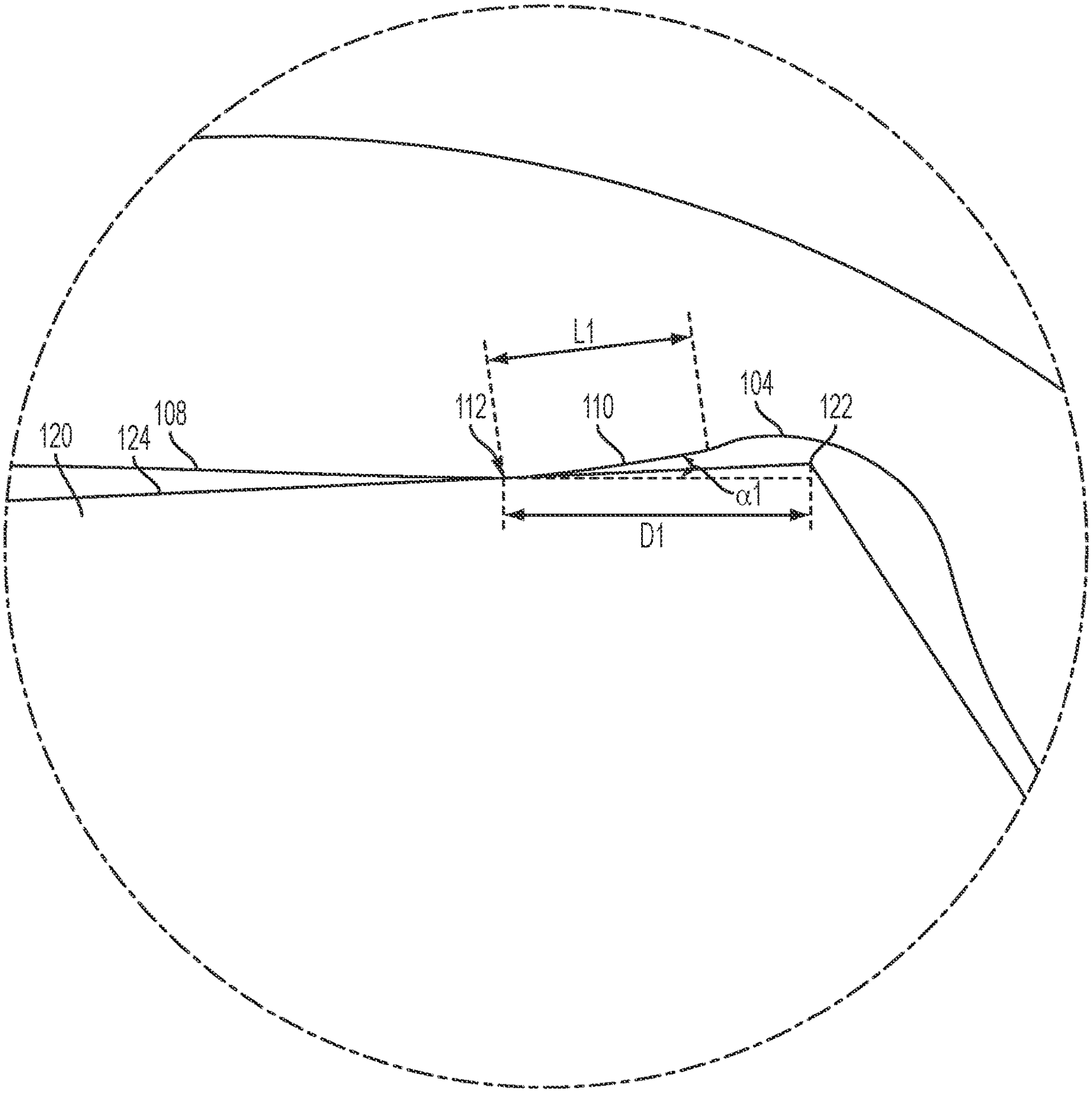
FIG. 1A is an enlarged sectional top plan view of the socket of FIG. 1 in accordance with an embodiment of the present application in engagement with a typical hexagonal bolt head or nut.

FIGS. 1 and 1A illustrate an embodiment of a socket 100 having a first axial bore 102 with a generally hexagonal shape. As illustrated in FIG. 1, the socket 100 is disposed on a typical head 120 of a fastener, such as a hexagonal bolt head or nut.

The first axial bore 102 includes six (6) corresponding recesses 104 equally spaced circumferentially in an inner sidewall of the socket 100. The recesses 104 are equally spaced from one another at about sixty (60) degree intervals circumferentially around the socket 100 so as to receive the corners 122 of the hexagonal head 120 of the fastener. The recesses 104 are dimensioned to provide for about three (3) degrees of rotation off center of the socket 100 with respect to the corners 122 of the head 120 of the fastener in either direction when corners 122 of the head 120 are substantially centrally aligned in the recesses 104.

The first axial bore 102 also includes six (6) longitudinal sidewalls 106 that extend between and are respectively interconnected by the recesses 104. Referring to FIG. 1A, each of the sidewalls 106 (illustrated in FIG. 1) includes a first substantially straight portion 108 disposed adjacent to second straight portion 110 that is angularly displaced with respect to the first portion 108. The second portion 110 extends from a recess 104 and intersects the first portion 108 at an angle. As illustrated in FIG. 1A, the second portion 110 is disposed at an angle ($\alpha 1$) with respect to the first portion 108. In an embodiment, the angle ($\alpha 1$) is about 4-12 degrees, and preferably about 7 degrees. The second portion 110 may also have a length (L1) equal to about 20-30 percent of a length of the first portion 108, and preferably about 26 percent.

This geometry of the first axial bore 102 provides for a contact point 112 between the sidewalls 106 (illustrated in FIG. 1), substantially at an intersection of a second portion 110 with the first portion 108, and a flank 124 or flat of the head 120 of the fastener that is away from the corner 122 of the fastener. As illustrated in FIG. 1A, the contact point 112 is a distance (D1) away from the corner 122. In an embodiment, the distance (D1) is about 30 to 60 percent of half a length of the flank 124 (half of the length between corners 122) of the head 120 of the fastener, and preferably, the distance (D1) is about 45 percent of half the length of the flank 124. It is to be understood that each end of sidewalls 106 intersection around the hexagonal shape is generally the same and mirrored as described above.

Referring to FIGS. 1-1A and 5-5A, when compared to a typical prior art hexagonal socket 500 having six (6) recesses 504 and six (6) longitudinal sidewalls 506, the contact point 112 of the socket 100 is further away from the corner 122 of the head 120 of the fastener than a contact point 512 of the socket 500. When the sockets 100 and 500 are ¾ inch sockets, for example, the contact point 112 of the present invention is at a distance (D1) of about 0.092 inches, compared to the contact point 512 of the prior art having a distance (DP1) of about 0.0548 inches. Additionally, the sidewalls 506 of the prior art socket 500 are merely straight, and do not include second portions, as illustrated in FIGS. 1 and 1A.

The increase in the distance of the contact point 112 away from the corner 122 of the head 120 of the fastener increases the surface area and shifts the load from the corner 122 and distributes the stress concentration further away from the corner 122. This allows more surface area of the sidewall 106 to contact the head 120, thereby improving the strength and operable life of the socket 100. This also reduces the risk of the head 120 becoming frictionally locked or stuck in the socket 100, and reduces the risk of the head 120 being stripped or the socket 100 slipping on the head 120.

Figure 2:
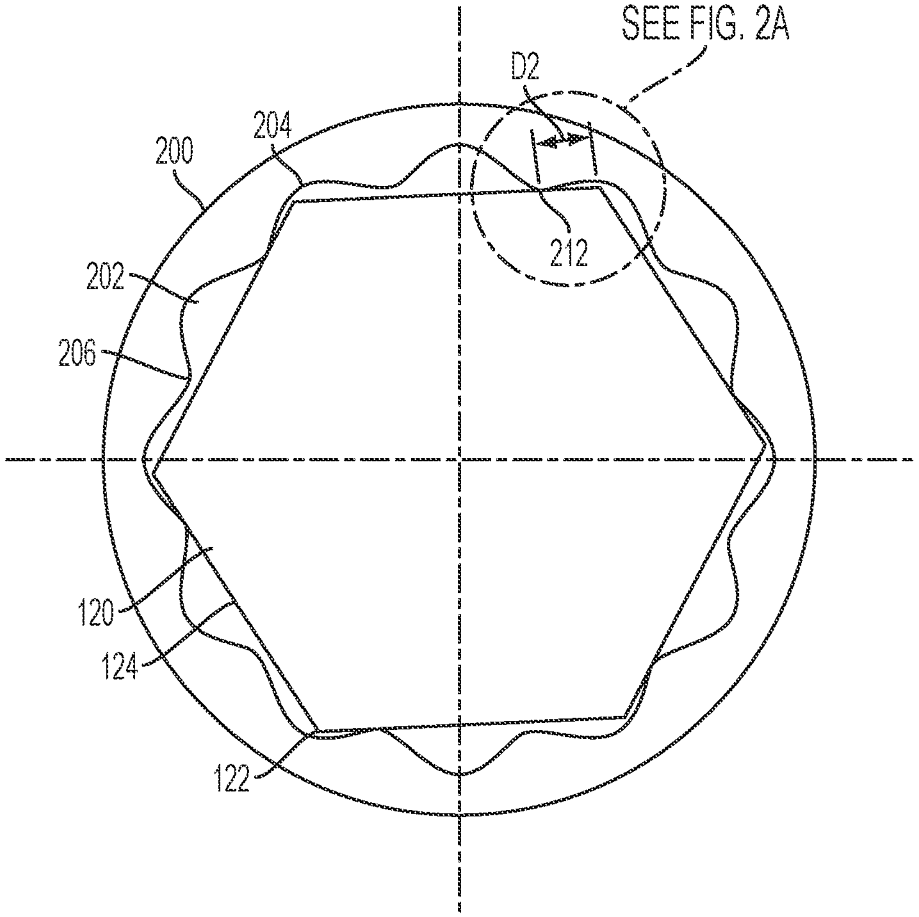
FIG. 2 is a top plan view of a dodecagonal socket in accordance with an embodiment of the present application in engagement with a typical hexagonal bolt head or nut.
Figure 2A:
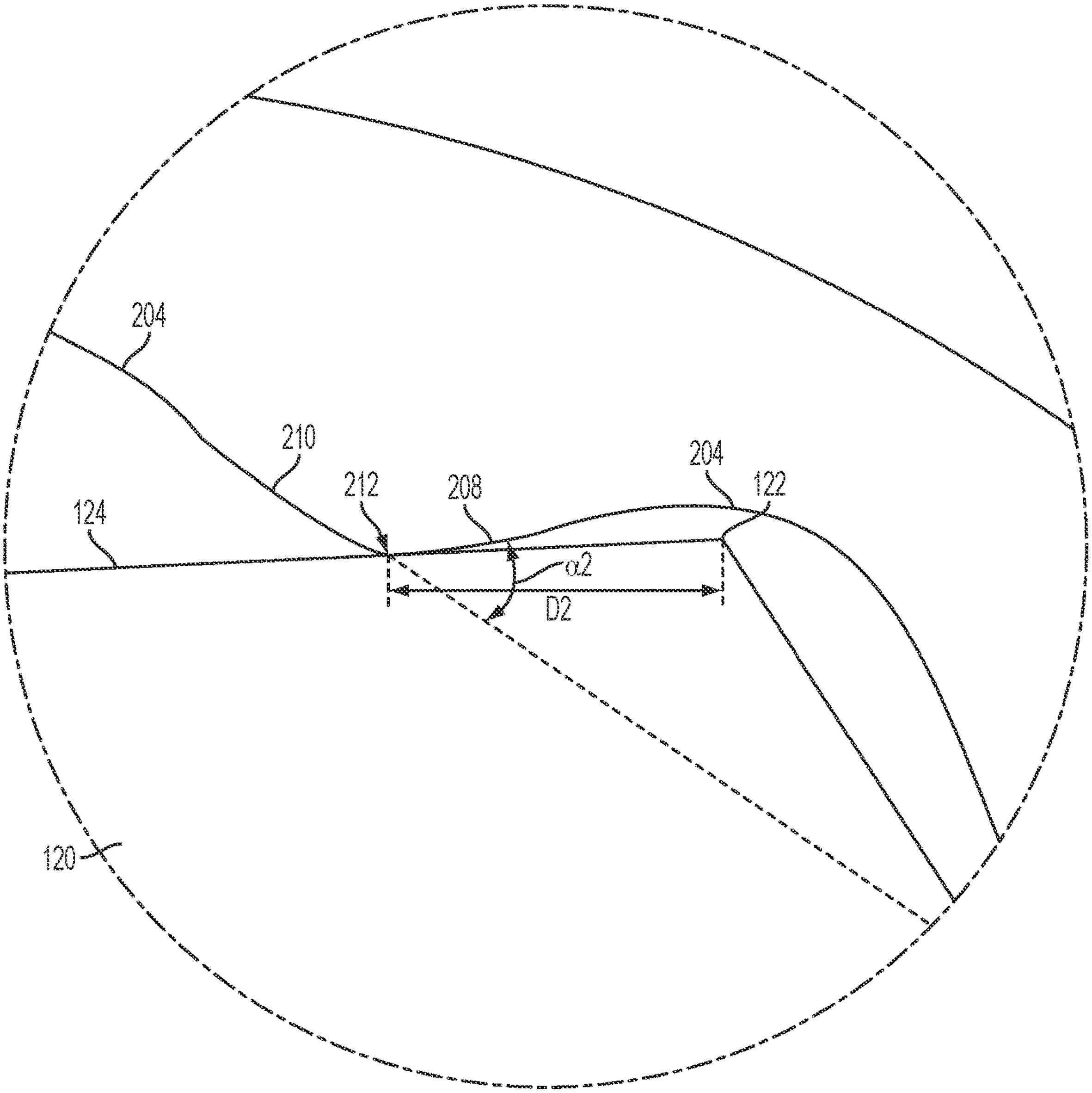
FIG. 2A is an enlarged sectional top plan view of the socket of FIG. 2 in accordance with an embodiment of the present application in engagement with a typical hexagonal bolt head or nut.

FIGS. 2 and 2A illustrate another embodiment of a socket 200 having a first axial bore 202 having a generally dodecagonal type shape (α/k/a double hexagonal). As illustrated in FIG. 2, the socket 200 is disposed on the head 120 of the fastener, such as a hexagonal bolt head or nut. The first axial bore 202 includes twelve (12) corresponding recesses 204 equally spaced circumferentially in an inner sidewall of the socket 200. The recesses 204 are equally spaced from one another at about thirty (30) degree intervals circumferentially around the socket 200 so as to receive the hexagonal head 120 of the fastener. In this embodiment, the recesses 204 are dimensioned to provide about three and six tenths (3.6) degrees of rotation off center of the socket 200 with respect to the head 120 of the fastener in either direction when the corners 122 of the head 120 are substantially centrally aligned in the recesses 204.

The first axial bore 202 also includes twelve (12) longitudinal sidewalls 206 respectively between the recesses 204. Referring to FIG. 2A, each of the sidewalls 206 includes a first straight portion 208 and a second straight portion 210 that are angularly displaced with respect to each other. The first and second portions 208, 210 each extend from respective recesses 204 and intersect with one another at an angle. As illustrated in FIG. 2A, the first portion 208 is disposed at an angle (α2) with respect to the second portion 210. In an embodiment, the angle (α2) is about 40-48 degrees, and preferably about 43 degrees. The first and second portions 208 and 210 may also have lengths substantially equal to one another.

This geometry of the axial bore 202 provides for a contact point 212 between the sidewalls 206 substantially at the intersection of the first and second portions 208 and 210 and the flank 124 is away from the corner 122 of the fastener. When in use, the socket 200 initially contacts the flank 124 of the fastener at the contact point 212 and as load increases, a surface area contact between the socket 200 and the flank 124 gradually increases in a direction towards the corner 122 and a recess 204.

As illustrated in FIG. 2A, the contact point 212 is a distance (D2) away from the corner 122. In an embodiment, the distance (D2) is about 30 to 60 percent of half a length of the flank 124 (half of the length between corners 122) of the head 120 of the fastener, and preferably the distance (D2) is about 40 percent of half the length of the flank 124. It is to be understood that each end of sidewalls 208, 210 intersection around the dodecagonal shape is generally the same and mirrored as described above.

Figure 6:
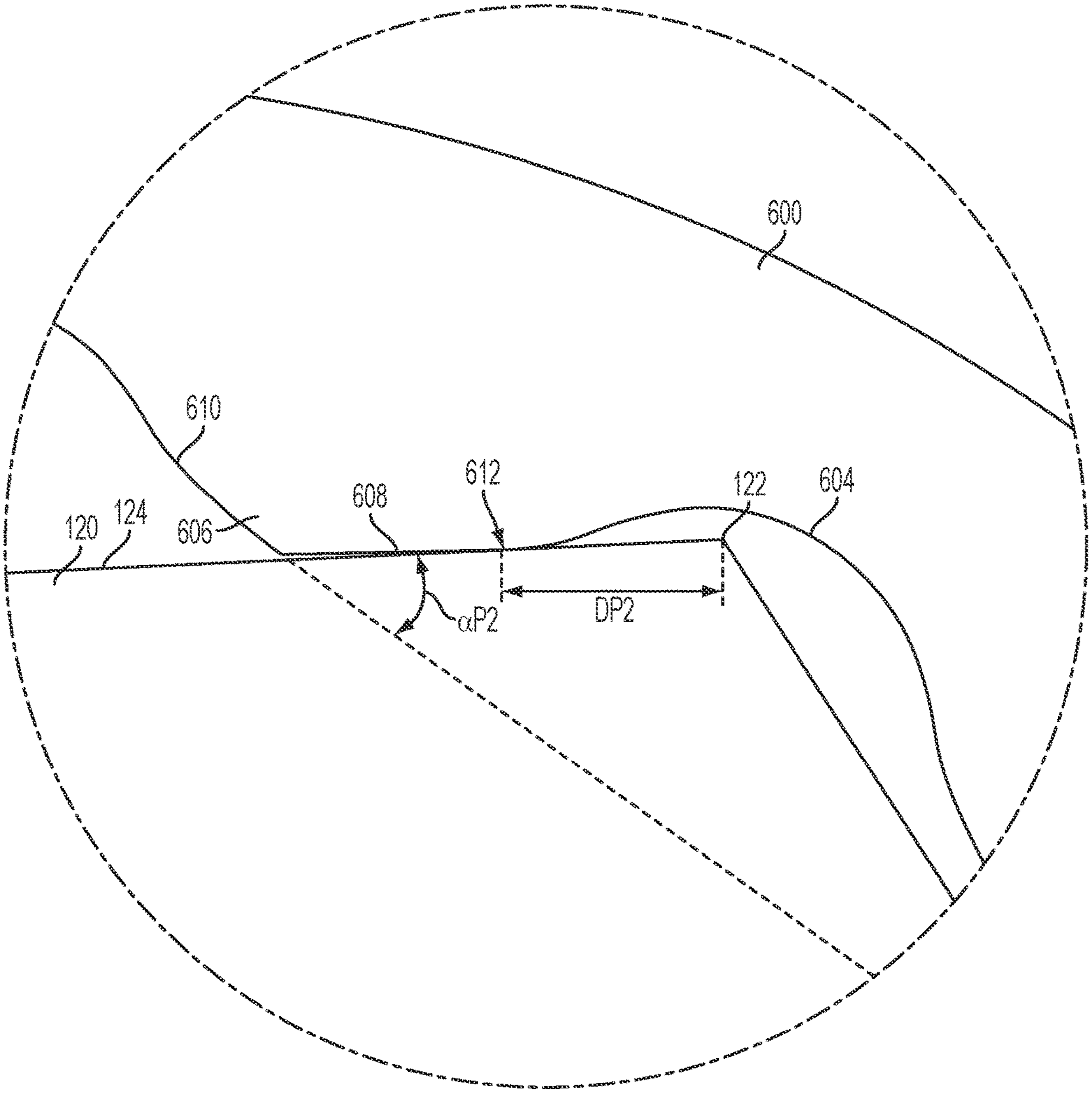
FIG. 6 PRIOR ART
FIG. 6 is an enlarged sectional top plan view of a prior art dodecagonal socket in engagement with a typical hexagonal bolt head or nut.

Referring to FIGS. 2-2A and 6, when compared to a typical prior art dodecagonal type socket 600 having twelve (12) recesses 604 and twelve (12) sidewalls 606, the contact point 212 of the socket 200 is further away from the corner 122 of the head 120 of the fastener than a contact point 612 of the socket 600. For example, when the sockets 200 and 600 are ¾ inch sockets, the contact point 112 is at a distance (D2) of about 0.0864 inches and the prior art contact point 612 is at a distance (DP2) less than 0.0864. As illustrated in FIG. 6, the contact point 612 of the socket 600 is proximal to an intersection of a first portion 608 and the recess 604. Additionally, the sidewalls 606 of the prior art socket 600 include first and second portions 608, 610 that are disposed at an angle (αP2) of about 36-37 degrees, which is smaller than the angle (α2) of the socket 200.

Figure 3:
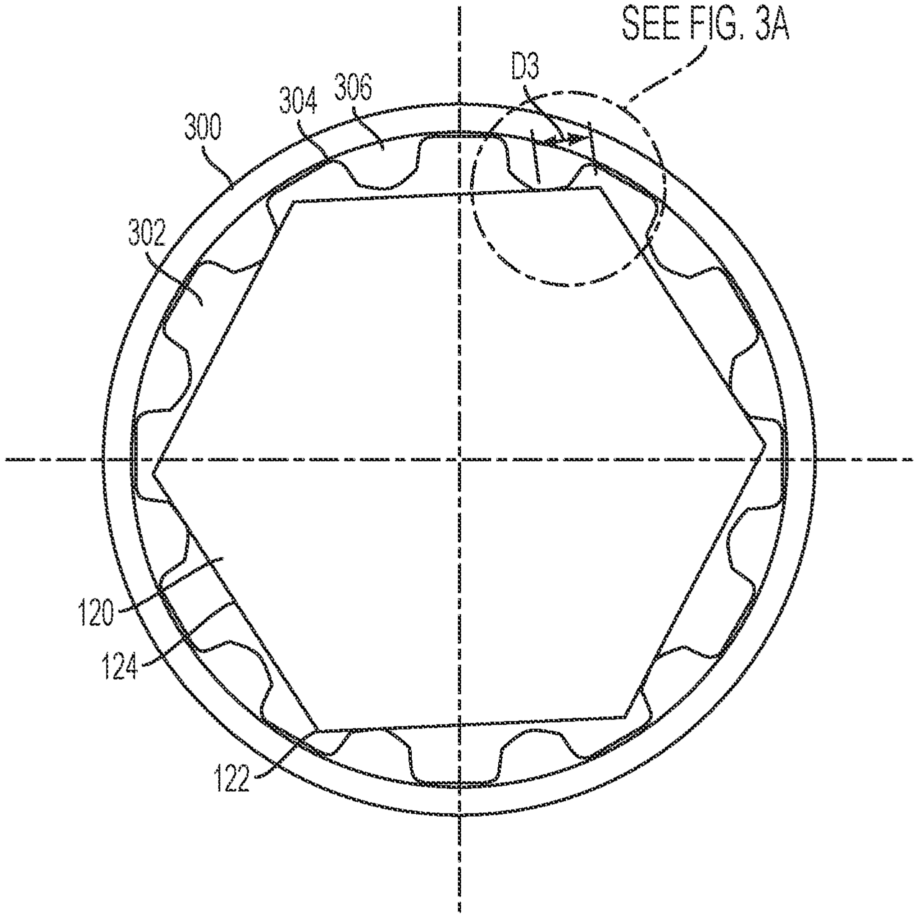
FIG. 3 is a top plan view of a splined socket in accordance with an embodiment of the present application in engagement with a typical hexagonal bolt head or nut.
Figure 3A:
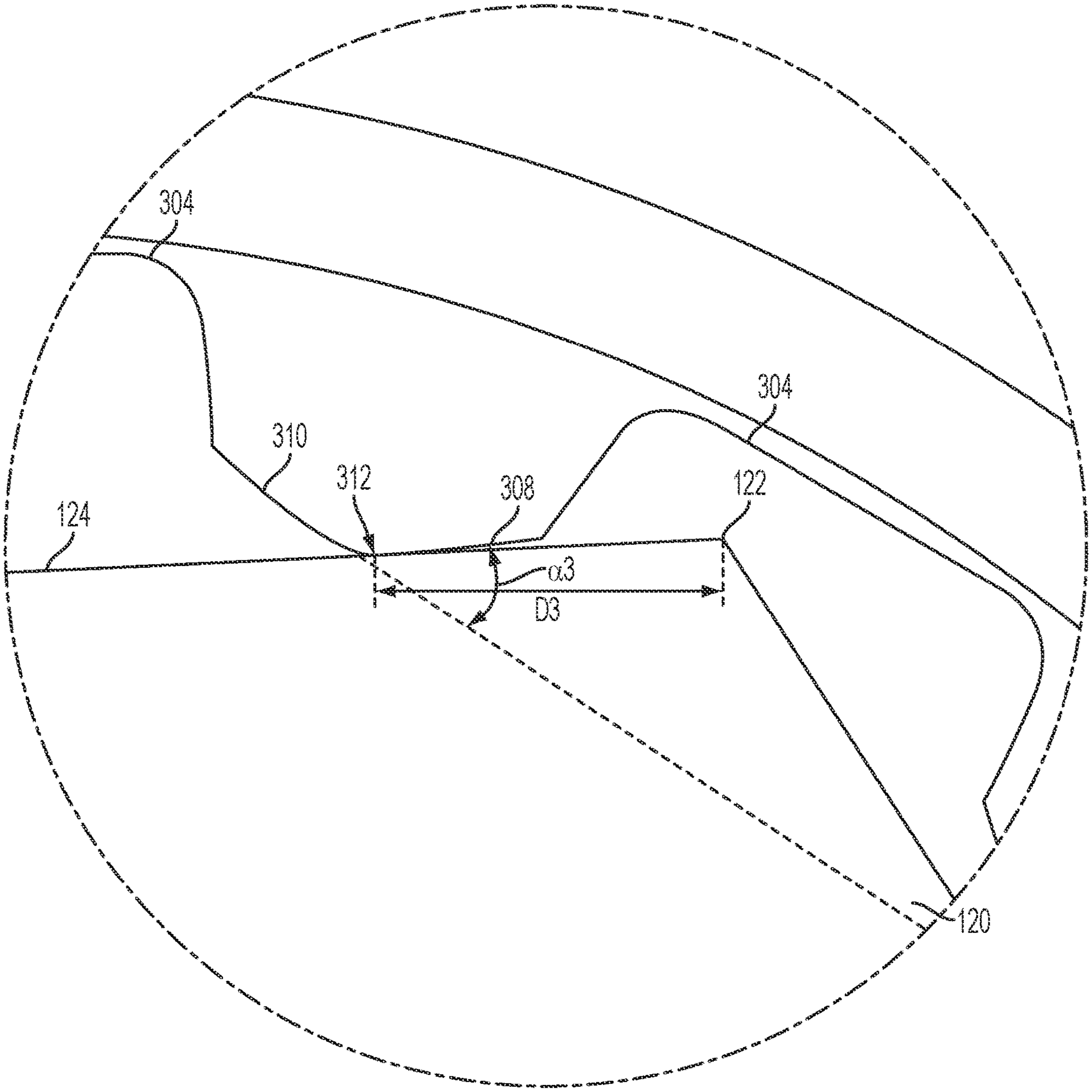
FIG. 3A is an enlarged sectional top plan view of the socket of FIG. 3 in accordance with an embodiment of the present application in engagement with a typical hexagonal bolt head or nut.

FIGS. 3 and 3A illustrate another embodiment of a socket 300 having a first axial bore 302 with a generally splined-type cross-sectional shape. As illustrated in FIG. 3, the socket 300 is disposed on the head 120 of the fastener, such as a hexagonal bolt head or nut. The axial bore 302 includes twelve (12) recesses 304 equally spaced circumferentially in an inner sidewall of the socket 300. The recesses 304 are equally spaced from one another at about thirty (30) degree intervals circumferentially around the socket 300 and have two (2) rounded inner corners. In this embodiment, the recesses 304 are dimensioned to provide about three and six tenths (3.6) to about four (4) degrees of rotation off center of the socket 300 with respect to the head 120 of the fastener in either direction when the corners 122 of the head 120 are centrally aligned in the recesses 304.

The axial bore 302 also includes twelve (12) sidewalls 306 respectively between the recesses 304. Referring to FIG. 3A, each of the sidewalls 306 includes a first portion 308 and a second portion 310 that are angularly displaced with respect to each other. The first and second portions 308 and 310 each extend from a recess 304 and intersect with one another at a rounded corner. As illustrated in FIG. 3A, the first portion 308 is disposed at an angle (α3) with respect to the second portion 310. In an embodiment, the angle (α3) is about 40-45 degrees, and preferably about 42 degrees. The first and second portions 308 and 310 may also have lengths substantially equal to one another. It is to be understood that each end of sidewalls 306 intersection around the splined shape is generally the same and mirrored as described above.

This geometry of the axial bore 302 provides for a contact point 312 between the sidewalls 306, proximal to an intersection of the first and second portions 308 and 310, and the flank 124 that is away from the corner 122 of the fastener. When in use, the socket 300 also initially contacts the flank 124 of the fastener at the contact point 312 and as load increases, a surface area contact between the socket 300 and the flank 124 gradually increases in a direction towards the corner 122 and a recess 304.

As illustrated in FIG. 3A, the contact point 312 is a distance (D3) away from the corner 122. In an embodiment, the distance (D3) is about 30 to 60 percent of half a length of the flank 124 (half of the length between corners 122) of the head 120 of the fastener, and preferably the distance (D3) is about 35 percent of half the length of the flank 124.

Figure 4:
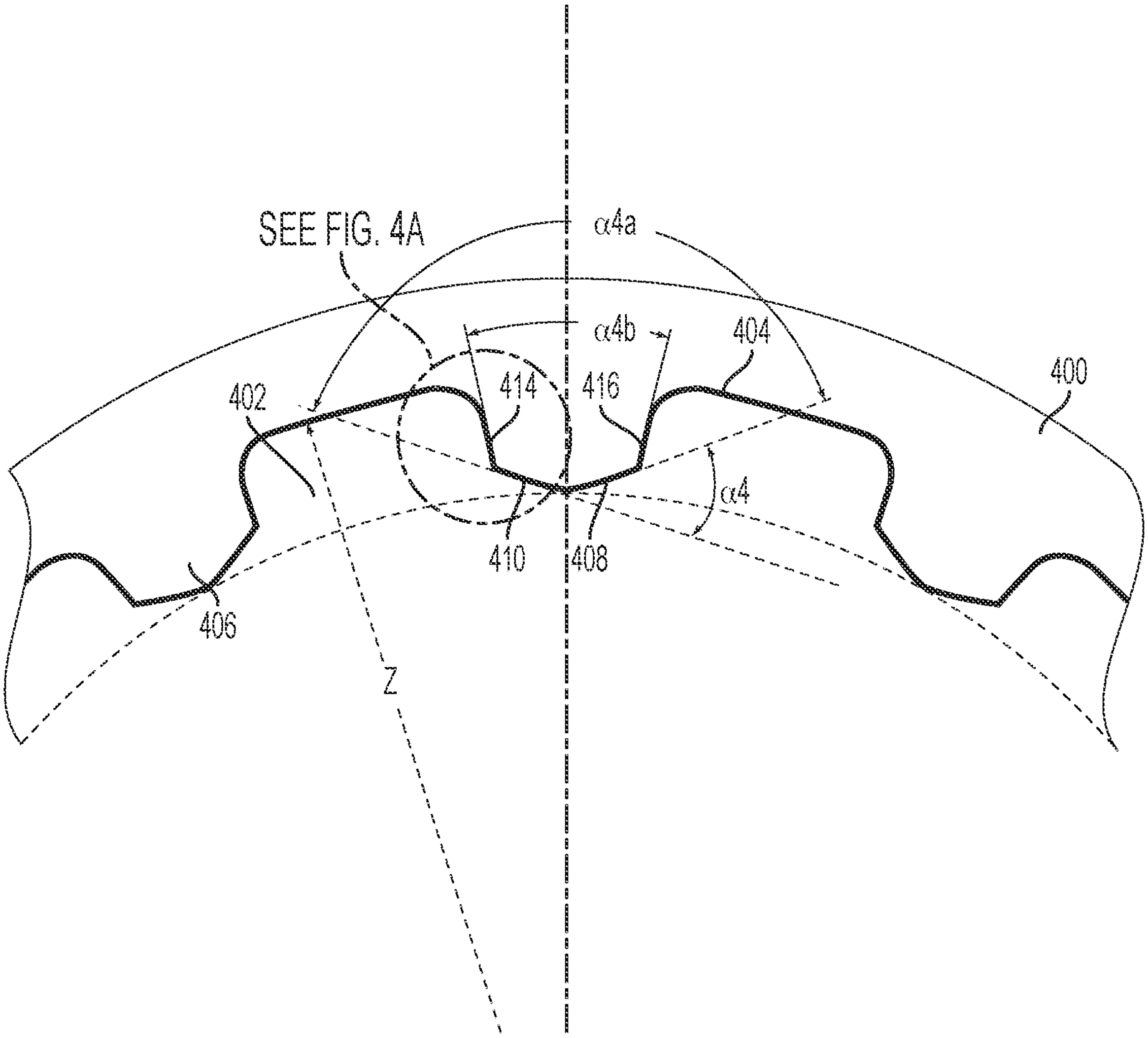
FIG. 4 is an enlarged sectional top plan view of a splined socket in accordance with an embodiment of the present application.
Figure 4A:
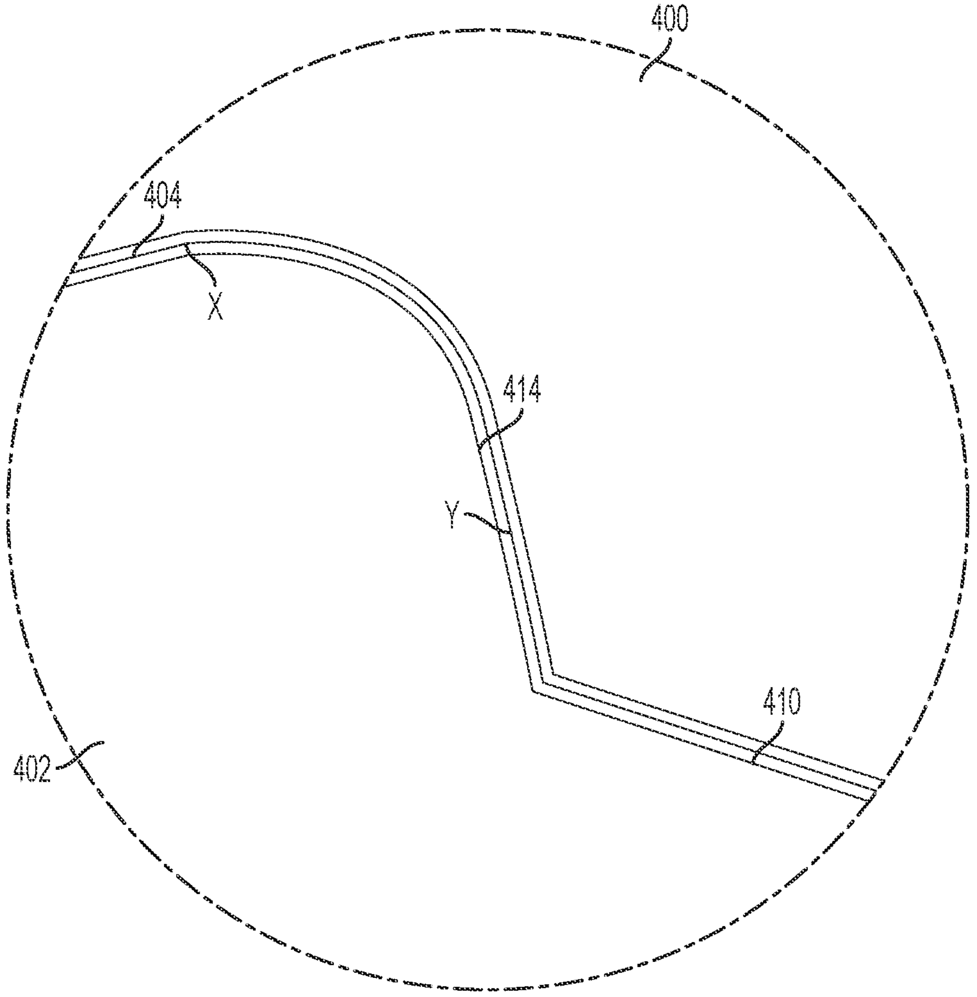
FIG. 4A is an enlarged sectional top plan view of the socket of FIG. 4 in accordance with an embodiment of the present application.
Figure 5:
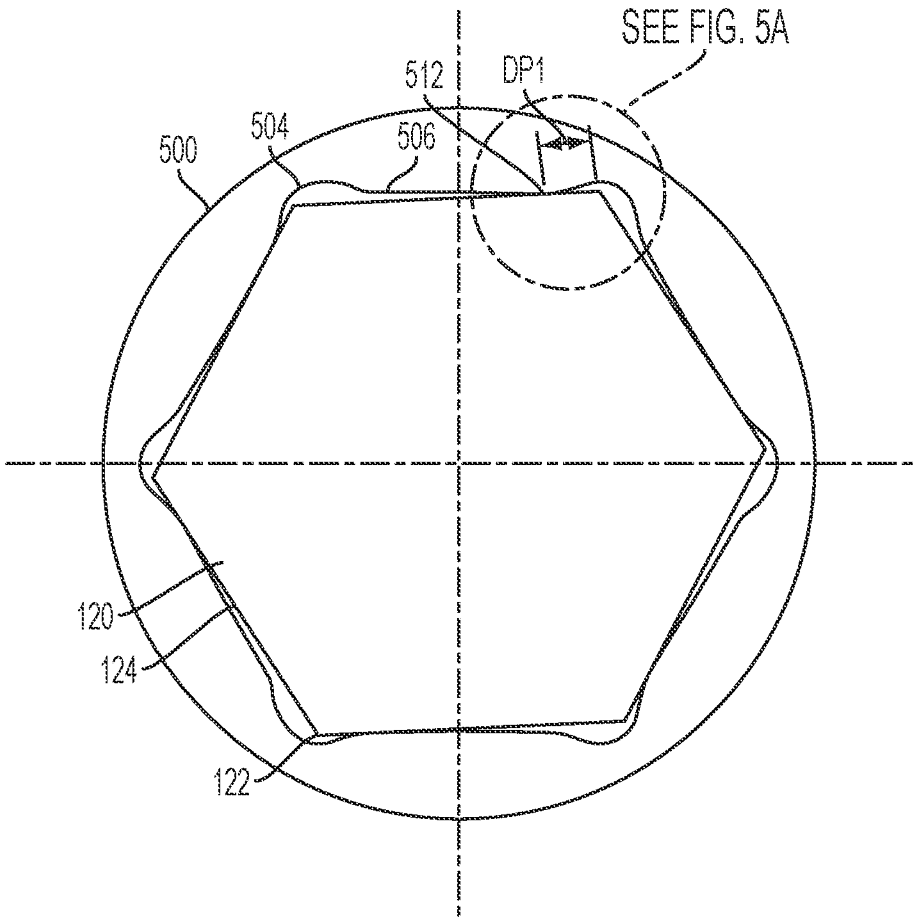
FIG. 5 PRIOR ART
FIG. 5 is a top plan view of a prior art hexagonal socket in engagement with a typical hexagonal bolt head or nut.
Figure 5A:
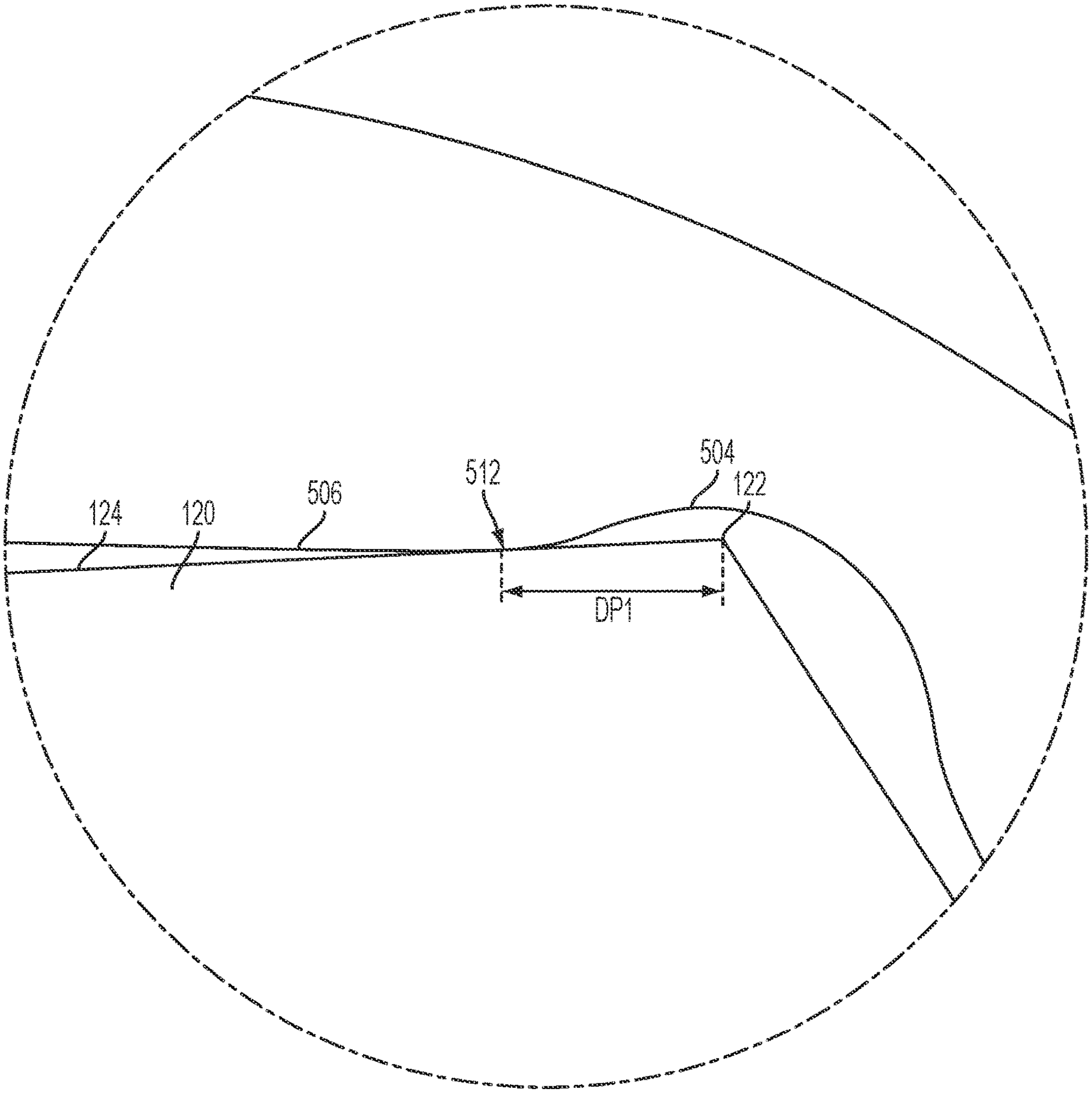
FIG. 5A PRIOR ART
FIG. 5A is an enlarged sectional top plan view of the socket of FIG. 4 in engagement with a typical hexagonal bolt head or nut.

FIGS. 4 and 4A illustrate another socket 400 having a first axial bore 402 having a splined type shape, similar to the socket 300. As illustrated in FIG. 4, the axial bore 402 includes twelve (12) recesses 404 equally spaced circumferentially in an inner sidewall of the socket 400. The recesses 404 are equally spaced from one another at about thirty (30) degree intervals circumferentially around the socket 400 and have two (2) rounded inner corners. In this embodiment, similar to the socket 300, the recesses 404 are dimensioned to provide about three and six tenths (3.6) to about four (4) degrees of rotation off center of the socket 400 with respect to the head of a fastener in either direction when the corners of the head are centrally aligned in the recesses 404.

The axial bore 402 also includes twelve (12) sidewalls 406 respectively between the recesses 404. Referring to FIG. 4, each of the sidewalls 406 includes a first portion 408 and a second portion 410 that are angularly displaced with respect to each other. The first and second portions 408 and 410 each extend from a recess 404 and intersect with one another at a rounded corner. As illustrated in FIG. 4, the first portion 408 is disposed at an angle (α4 or α4*a*) with respect to the second portion 410. In an embodiment, the angle (α4) is about 40-45 degrees, and preferably about 41.6 degrees, and the angle (α4*a*) is about 140-135 degrees, and preferably about 138.4 degrees. The first and second portions 408 and 410 may also have lengths substantially equal to one another.

In an embodiment, the recesses 404 form angled wall portions 414 and 416 that are angularly displaced with respect to one another at an angle ($\alpha 4b$). In an embodiment, the angle ($\alpha 4b$) is about 20-24 degrees, and preferably about 22 degrees. Referring to FIG. 4A, additionally, a radius (resulting from an arc tangent to Z at point X and tangent to flank Y) is maximized within the allowable spline geometry of the socket 400. In this embodiment, the width of the teeth (i.e. the sidewalls 406) may be reduced to increase strength of the walls of the socket 400. It is to be understood that each end of sidewalls 406 intersection around the dodecagonal shape is generally the same and mirrored as described above.

Like the socket 300, the geometry of the axial bore 402 may provide for a contact point between the sidewalls 406, proximal to an intersection of the first and second portions 408 and 410, and the flank that is away from the corner of the fastener. Similarly, when in use, the socket 400 may also initially contacts the flank of the fastener at the contact point and as load increases, a surface area contact between the socket 400 and the flank may increase in a direction towards the corner and a recess 404.

Figure 7:
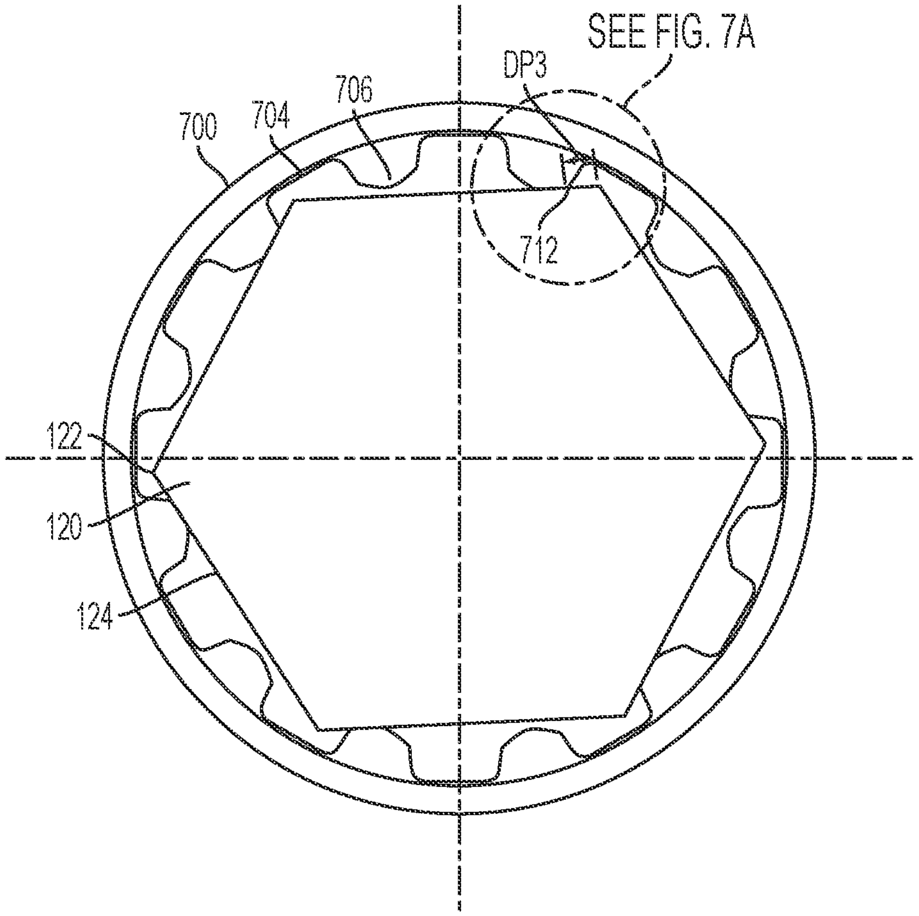
FIG. 7 PRIOR ART
FIG. 7 is a top plan view of a prior art splined socket in engagement with a typical hexagonal bolt head or nut.
Figure 7A:
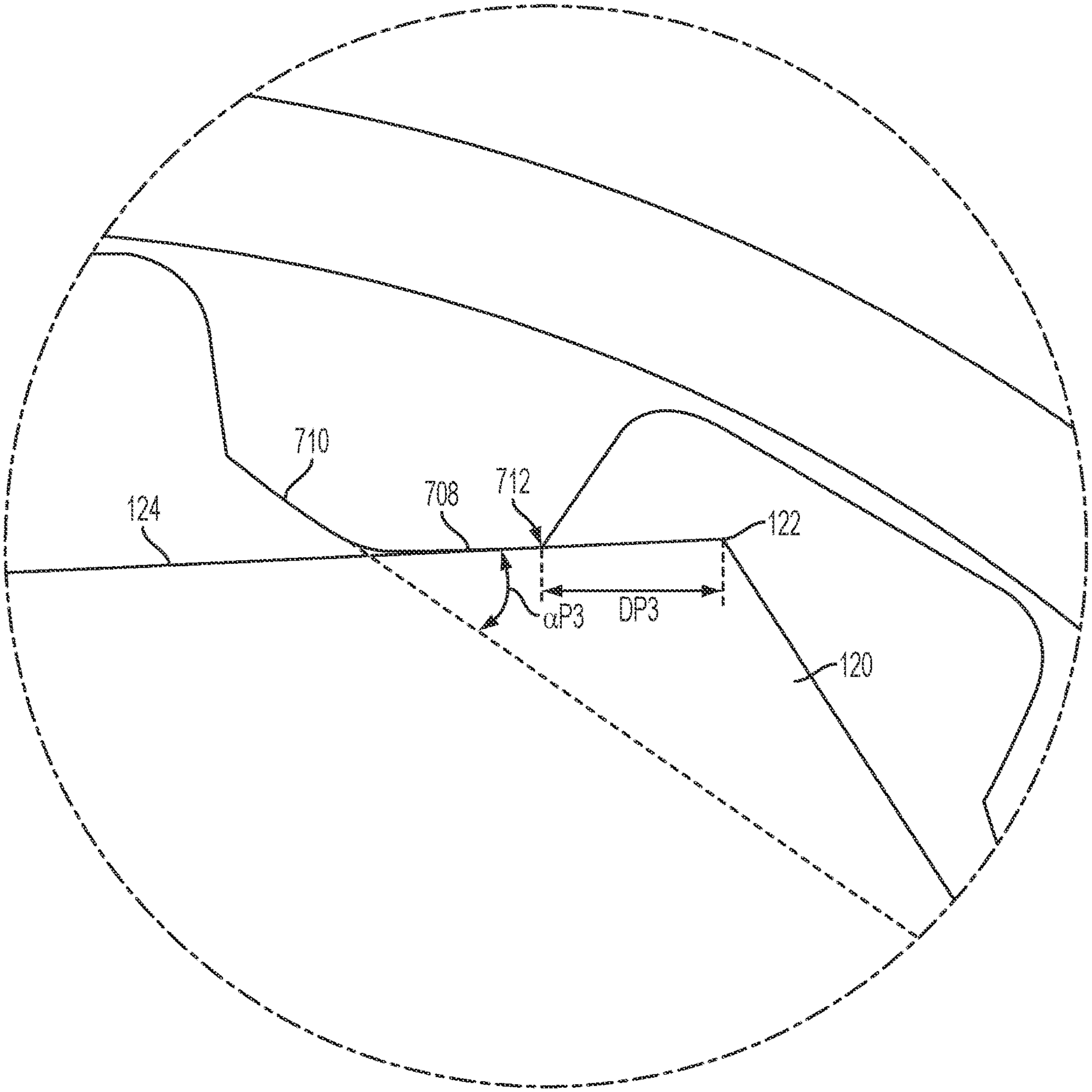
FIG. 7A PRIOR ART
FIG. 7A is an enlarged sectional top plan view of the socket of FIG. 6 in engagement with a typical hexagonal bolt head or nut.

Referring to FIGS. 3-4 and 7-7A, when compared to a typical prior art splined type socket 700 having twelve (12) recesses 704 and twelve (12) sidewalls 706, the contact point 312 of the socket 300 and the contact point of the socket 400 is further away from the corner 122 of the head 120 of the fastener than a contact point 712 of the socket 700. For example, when the sockets 300 and 700 are ¾-inch sockets, the contact point 312 is at a distance (D3) of about 0.076 inches and the contact point 712 of the prior art socket is at a distance (DP2) of about 0.0492. As illustrated in FIG. 7A, the contact point 712 of the socket 700 is proximal to an intersection of a first portion 708 and the recess 704. Additionally, the sidewalls 706 of the prior art socket 700 include first and second portions 708 and 710 that are disposed at an angle ($\alpha$P3) of about 36-37 degrees, which is smaller than the angle ($\alpha$3) of the socket 300 and the angle ($\alpha$4) of the socket 400.

The increase in the distance of the contact points away from the corner 122 of the head 120 of the fastener, described with reference to FIGS. 1-4A, shifts the load on the corner 122 and distributes the stress concentration away from the corner 122. This allows more surface area of the sockets to contact the head 120, thereby improving the strength and operable life of the sockets. This also reduces the risk of the head 120 becoming locked or stuck in the sockets, and reduces the risk of the head 120 being stripped or the sockets slipping on the head 120.

The sockets described herein are described generally with respect to a ¾ inch socket; however, the sizes and dimensions of the various elements of the socket described herein may be modified or adapted for a particular use with one or more different tools. For example, the socket may be adapted to receive different fastener sizes, for example, 1 inch, ½ inch, 10 mm, 12 mm, 14 mm, etc., as known in the art. Similarly, the size of the second axial bore can be adapted to receive different sizes and types of drive shafts or drive lugs of socket wrenches.

Further, the geometry of the inner surface of the sockets described herein may be applied to other types of tools for applying torque to fasteners. For example, a wrench or box wrench may include the geometries disclosed herein to allow the wrench or box wrench to have a contact point positioned away from a corner of a fastener. Similarly, other tools and/or fasteners may include the geometries disclosed herein.

Although the devices and methods have been described and illustrated in connection with certain embodiments, many variations and modifications will be evident to those skilled in the art and may be made without departing from the spirit and scope of the present disclosure. The present disclosure is thus not to be limited to the precise details of methodology or construction set forth above as such variations and modification are intended to be included within the scope of the present disclosure. Moreover, unless specifically stated any use of the terms first, second, etc. do not denote any order or importance, but rather the terms first, second, etc. are merely used to distinguish one element from another.

What is claimed is:

1. A tool adapted to engage a fastener head having corners and flanks that respectively extend between two corners, wherein each of the flanks has a flank length between the two corners, the tool comprising:

an inner surface having six sidewalls and six recesses, wherein each of the sidewalls extends between two adjacent recesses, wherein each of the recesses is adapted to receive one of the corners of the fastener head, and each recess allows about 3 to about 4 degrees of rotation of the tool relative to the fastener head when the corners are respectively received in the recesses, and wherein each of the sidewalls includes substantially straight first and second portions that are angularly disposed by about 4 to about 12 degrees relative to each other, and an intersection between the first and second portions defines a contact point that is adapted to abut one of the flanks of the fastener head at a distance of about 30 to about 60 percent of half of the flank length from one of the corners.

2. The tool of claim 1, wherein the contact point is adapted to abut the flank at a distance of about 45 percent of half the flank length from one of the corners.

3. The tool of claim 1, wherein the contact point is adapted to abut the flank at a distance of about 40 percent of half the flank length from one of the corners.

4. The tool of claim 1, wherein the contact point is adapted to abut the flank of the fastener head at a distance of about 35 percent of half the flank length from one of the corners.

5. The tool of claim 1, wherein the contact point is a rounded corner.

6. The tool of claim 1, further comprising a socket body having an axial bore, wherein the inner surface is defined in the axial bore.

7. The tool of claim 1, further comprising a wrench body having the inner surface.

8. The tool of claim 1, wherein the first and second portions respectively have first and second portion lengths, and the first portion length is about 20 to about 30 percent of the second portion length.

9. The tool of claim 8, wherein each of the sidewalls further includes a third portion extending from the second portion, the third portion is angularly disposed relative to the second portion by about 4 degrees to about 12 degrees.

10. The tool of claim 9, wherein the third portion has a third portion length of about 20 to about 30 percent of the second portion length.

11. A tool adapted to engage a fastener head having corners and flanks that respectively extend between two corners, wherein each of the flanks has a flank length between the two corners, the tool comprising:

an inner surface having twelve sidewalls and twelve recesses, wherein each of the sidewalls extends between two adjacent recesses, wherein each of the recesses includes two rounded corners and allows about 3 to about 4 degrees of rotation of the tool relative to the fastener head when the corners are respectively received in the recesses, and wherein each of the sidewalls includes substantially straight first and second portions that are angularly disposed by about 40 to about 45 degrees relative to each other and creates an intersection between the first and second portions that defines a contact point that is adapted to abut one of the flanks of the fastener head at a distance of about 30 to about 60 percent of half of the flank length from one of the corners.

12. The tool of claim 11, wherein the contact point is adapted to abut the flank at a distance of about 45 percent of half the flank length from one of the corners.

13. The tool of claim 11, wherein the contact point is adapted to abut the flank at a distance of about 40 percent of half the flank length from one of the corners.

14. The tool of claim 11, wherein the contact point is adapted to abut the flank of the fastener head at a distance of about 35 percent of half the flank length from one of the corners.

15. The tool of claim 11, wherein the first and second portions are angularly disposed by about 42 degrees relative to each other.

16. The tool of claim 11, wherein the first and second portions are angularly disposed by about 41.6 degrees relative to each other.

17. The tool of claim 11, wherein each of the recesses includes first and second wall portions that are angularly disposed by about 20 to about 24 degrees relative to each other.

18. The tool of claim 17, wherein the first and second wall portions are angularly disposed by about 22 degrees relative to each other.

19. The tool of claim 11, further comprising a socket body having an axial bore, wherein the inner surface is defined in the axial bore.

20. The tool of claim 11, further comprising a wrench body having the inner surface.

* * * * *